US011175935B2

(12) United States Patent
Duesterwald et al.

(10) Patent No.: US 11,175,935 B2
(45) Date of Patent: *Nov. 16, 2021

(54) PATH-SENSITIVE CONTEXTUAL HELP SYSTEM

(71) Applicant: International Business Machines Corporation, Armonk, NY (US)

(72) Inventors: Evelyn Duesterwald, Millwood, NY (US); John C. Thomas, Yorktown Heights, NY (US); Patrick A. Wagstrom, Coventry, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,179

(22) Filed: Jan. 14, 2020

(65) Prior Publication Data

US 2020/0150986 A1     May 14, 2020

Related U.S. Application Data

(63) Continuation of application No. 15/349,272, filed on Nov. 11, 2016, now Pat. No. 10,579,400.

(51) Int. Cl.
*G06F 9/451* (2018.01)
*G06F 11/34* (2006.01)

(52) U.S. Cl.
CPC .............. *G06F 9/453* (2018.02); *G06F 11/34* (2013.01); *G06F 11/3438* (2013.01); *G06F 11/3466* (2013.01)

(58) Field of Classification Search
CPC ...... G06F 9/453; G06F 11/34; G06F 11/3438; G06F 11/3466
See application file for complete search history.

(56) References Cited

U.S. PATENT DOCUMENTS

| 4,648,044 A | * | 3/1987 | Hardy | ...................... G06N 5/04 |
| | | | | 706/60 |
| 5,239,617 A | * | 8/1993 | Gardner | .............. G06F 16/3329 |
| | | | | 706/11 |
| 6,021,403 A | * | 2/2000 | Horvitz | .................... G06N 5/00 |
| | | | | 706/45 |

(Continued)

FOREIGN PATENT DOCUMENTS

WO     WO1992002880 A1 *    2/1992

OTHER PUBLICATIONS

List of IBM Patents or Patent Applications Treated as Related; (Appendix P), Filed Jan. 15, 2020; 2 pages.

*Primary Examiner* — Yongjia Pan
(74) *Attorney, Agent, or Firm* — Cantor Colburn LLP; Stosch Sabo

(57) ABSTRACT

Embodiments include method, systems and computer program products for a path-sensitive contextual help system. In some embodiments, user actions are obtained from a user session of a user. A concrete user action trace is captured using the obtained user actions, wherein the concrete user action trace is a subset of user actions from the user session. An abstract user action trace is generated using the concrete user action trace. A help action corresponding to the abstract user action trace is identified and, in some embodiments, is presented to the user.

20 Claims, 5 Drawing Sheets

(56) References Cited

U.S. PATENT DOCUMENTS

| | | | | |
|---|---|---|---|---|
| 6,167,358 | A * | 12/2000 | Othmer | G06F 11/0748 702/188 |
| 6,262,730 | B1 * | 7/2001 | Horvitz | G06N 5/00 715/707 |
| 6,307,544 | B1 * | 10/2001 | Harding | G06F 9/453 715/709 |
| 6,339,436 | B1 | 1/2002 | Amro et al. | |
| 6,959,294 | B2 * | 10/2005 | Sullivan | G06F 9/453 706/50 |
| 6,968,505 | B2 | 11/2005 | Stoll et al. | |
| 7,080,321 | B2 * | 7/2006 | Aleksander | G06F 16/957 715/708 |
| 7,194,685 | B2 | 3/2007 | Morrison | |
| 7,499,948 | B2 | 3/2009 | Smith et al. | |
| 7,526,722 | B2 | 4/2009 | Wadhwa | |
| 7,533,339 | B2 | 5/2009 | Wadhwa | |
| 7,594,176 | B1 * | 9/2009 | English | G06F 9/453 715/708 |
| 7,979,798 | B2 | 7/2011 | Wadhwa | |
| 8,024,660 | B1 | 9/2011 | Quinn et al. | |
| 8,042,055 | B2 | 10/2011 | Wenig et al. | |
| 8,135,758 | B2 | 3/2012 | Bradateanu et al. | |
| 8,151,192 | B2 | 4/2012 | Black et al. | |
| 8,255,813 | B2 | 8/2012 | Yaseen et al. | |
| 8,504,994 | B2 | 8/2013 | Golender et al. | |
| 8,645,756 | B1 * | 2/2014 | Lee | G06F 11/0748 714/26 |
| 9,183,072 | B1 * | 11/2015 | Makuch | G06F 11/0748 |
| 9,497,091 | B2 | 11/2016 | Smith et al. | |
| 2002/0047859 | A1 * | 4/2002 | Szlam | G06F 16/957 715/705 |
| 2003/0001875 | A1 * | 1/2003 | Black | G06F 9/453 715/708 |
| 2003/0058267 | A1 | 3/2003 | Warren | |
| 2003/0084115 | A1 * | 5/2003 | Wood | H04L 29/06 709/217 |
| 2004/0199828 | A1 * | 10/2004 | Cabezas | G06F 11/261 714/39 |
| 2005/0081152 | A1 * | 4/2005 | Commarford | G06F 9/453 715/705 |
| 2005/0268234 | A1 * | 12/2005 | Rossi, Jr. | G06F 9/453 715/705 |
| 2006/0026531 | A1 * | 2/2006 | Lin | G06F 9/44505 715/809 |
| 2006/0288261 | A1 * | 12/2006 | Yuan | G06F 11/079 714/48 |
| 2008/0126283 | A1 * | 5/2008 | Odom | G06F 11/2252 706/45 |
| 2008/0250316 | A1 | 10/2008 | Zhang et al. | |
| 2008/0294423 | A1 * | 11/2008 | Castellani | G06F 11/0793 704/4 |
| 2008/0301559 | A1 | 12/2008 | Martinsen et al. | |
| 2010/0049686 | A1 * | 2/2010 | Gotz | G06Q 30/00 706/47 |
| 2010/0205238 | A1 | 8/2010 | Cao et al. | |
| 2010/0229112 | A1 * | 9/2010 | Ergan | G06F 11/0748 715/764 |
| 2011/0246881 | A1 | 10/2011 | Kishman et al. | |
| 2012/0033249 | A1 | 2/2012 | Van | |
| 2012/0203730 | A1 * | 8/2012 | Biran | G06N 5/025 706/48 |
| 2012/0290936 | A1 | 11/2012 | Mahmud | |
| 2012/0324375 | A1 | 12/2012 | Mathews | |
| 2013/0124641 | A1 | 5/2013 | Ryabchun et al. | |
| 2013/0136253 | A1 | 5/2013 | Liberman Ben-Ami et al. | |
| 2013/0215116 | A1 | 8/2013 | Siddique et al. | |
| 2013/0294257 | A1 | 11/2013 | Gonzalez De Langarica et al. | |
| 2014/0025588 | A1 * | 1/2014 | Chinnappa | G06Q 30/01 705/304 |
| 2014/0040786 | A1 | 2/2014 | Swanson et al. | |
| 2015/0263914 | A1 | 9/2015 | Armstrong et al. | |
| 2016/0103759 | A1 | 4/2016 | Avery et al. | |
| 2016/0179658 | A1 | 6/2016 | Avery et al. | |
| 2018/0136949 | A1 | 5/2018 | Duesterwald et al. | |

* cited by examiner

PATH-SENSITIVE CONTEXTUAL HELP SYSTEM

DOMESTIC PRIORITY

This application is a continuation of U.S. application Ser. No. 15/349,272, filed Nov. 11, 2016, the contents of which are incorporated by reference herein in its entirety.

BACKGROUND

The present disclosure relates to data processing, and more specifically, to methods, systems and computer program products for a path-sensitive contextual help system.

Known computer-based help systems provide topic-oriented, procedural or reference information to users in different ways, such as pop-up windows, web pages, or the like. The information provided by help systems is intended to help a person to interact with software, which can include describing a user interface as well as explanations or documentation that help enable the user to apply the software capabilities to their needs. Help systems can employ different components, such as wizards, tutorials, digital manuals (e.g., PDF of printed manuals), and/or user interface text.

SUMMARY

In accordance with one or more embodiments, a computer-implemented method for a path-sensitive contextual help system is provided. User actions are obtained from a user session of a user. A concrete user action trace is captured using the obtained user actions, wherein the concrete user action trace is a subset of user actions from the user session. An abstract user action trace is generated using the concrete user action trace. A help action corresponding to the abstract user action trace is identified and, in some embodiments, is presented to the user.

In one or more embodiments, a computer program product for providing path sensitive contextual help is provided. The computer program product includes a computer readable storage medium having program instructions embodied therewith, the program instructions readable by a processing circuit to perform a method that includes obtaining user actions from a user session of a user. A concrete user action trace is captured using the obtained user actions, wherein the concrete user action trace is a subset of user actions from the user session. An abstract user action trace is generated using the concrete user action trace. A help action corresponding to the abstract user action trace is identified and, in some embodiments, is presented to the user. Presentation of the help action to the user may be facilitated.

In one or more embodiments, a system may include a processor in communication with one or more types of memory. The processor may be configured to obtain user actions from a user session of a user. A concrete user action trace may be captured using the obtained user actions, wherein the concrete user action trace is a subset of user actions from the user session. An abstract user action trace may be generated using the concrete user action trace. A help action corresponding to the abstract user action trace may be identified. Presentation of the help action to the user may be facilitated.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, described herein are methods, systems and computer program products for providing path-sensitive contextual help.

Many online help systems available through web applications can facilitate displaying a "help view" in reaction to a particular help trigger event. A help trigger event can be a user action that suggests that the user may need help. A user action can be an action a user takes to interact with a software system. Examples of user actions include mouse clicks, text inputs, scrolling, and the like. Examples of a help trigger event include a long pause between user actions, which can indicate that the user does not know what to do next. Other examples of help trigger events include, but are not limited to, a user repeatedly selecting a "help" button, a user repeatedly selecting a "Back" or "Forward" button in a browser, or the like.

The systems and methods described herein are directed to providing targeted and customized help information using a history of user actions that led to the triggering of the help trigger event. According to embodiments of the disclosure described herein, a user context is maintained during a user session of a user so that the context is available whenever a help trigger event is fired. The user context can be based on a history of the user session that is captured in a history buffer. The history buffer can contain user actions, which are processed and abstracted to semantically higher-level actions. The abstracted user actions may be presented to the user context. The user context is used to determine a user intention and provide targeted help information to the user. The abstract user actions can be compared to a system help table. The system help table stores trace expressions and corresponding help actions. The abstract user actions can be used to build trace expressions that are compared to those stored in the system help table. Once a match is found, a corresponding help action may be presented to the user. If a match is not found, a generic help view can be displayed to the user.

Figure 1:
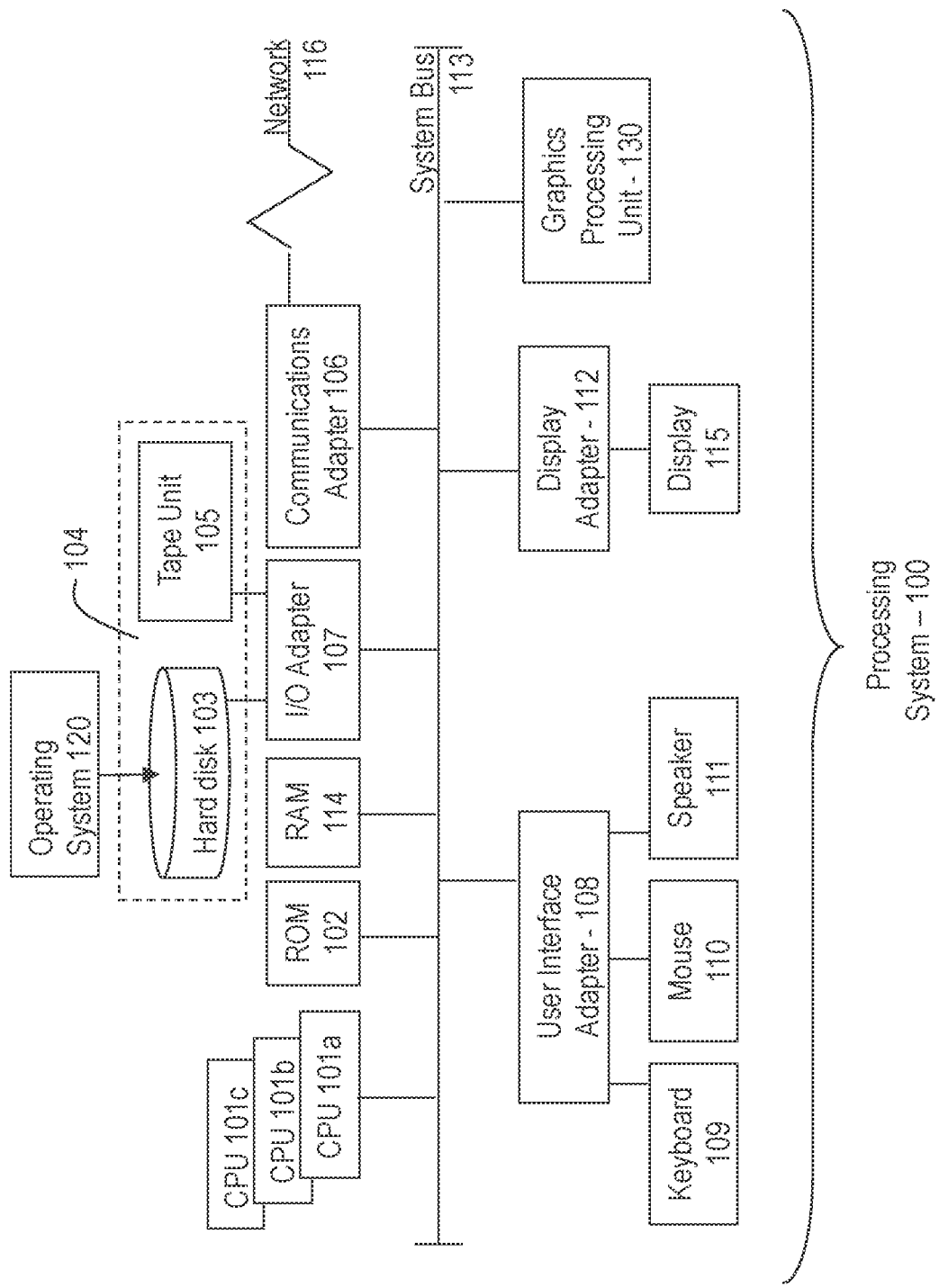
FIG. 1 is a block diagram illustrating one example of a processing system for practice of the teachings herein.

Referring to FIG. 1, there is shown a processing system 100 for implementing the teachings of the present disclosure according to one or more embodiments described herein. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
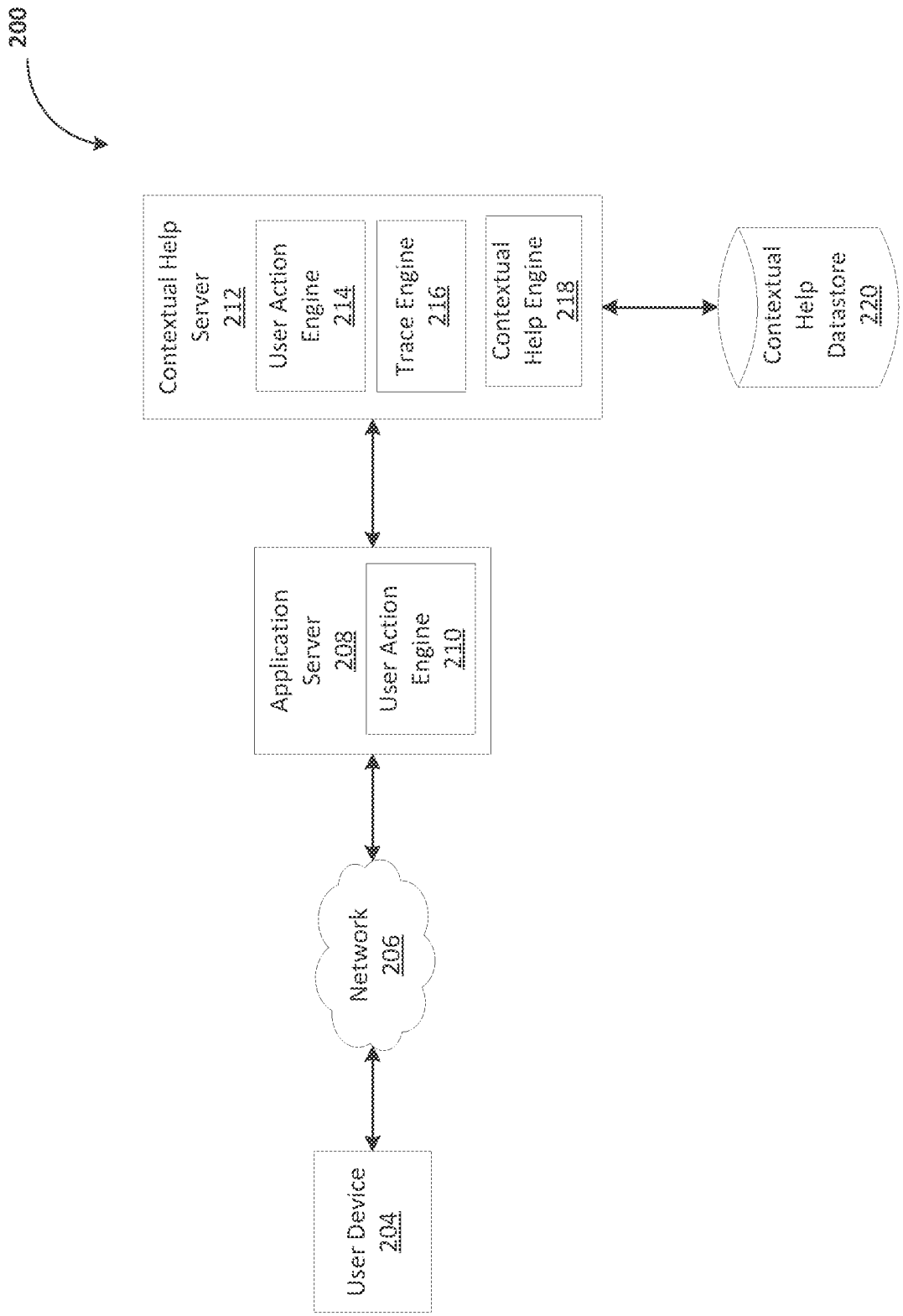
FIG. 2 is a block diagram illustrating a computing system in accordance with an exemplary embodiment.

Referring now to FIG. 2, there is illustrated a computing system 200 in accordance with one or more embodiments of the invention. As illustrated, the computing system 200 can include, but is not limited to, a user device 204, an application server 208, and/or a contextual help server 212 connected over one or more networks 206. In some embodiments, the application server 208 can include a user action engine 210. The contextual help server 212 can include a user action engine 214, a trace engine 216, and/or a contextual help engine 218.

In some embodiments, the user device 204 can be any type of computing device, such as a computer, laptop, tablet, smartphone, wearable computing device, server, etc. The user device 204 can include one or more applications, such as a web browser or dedicated client application that can communicate with the application server 208 over one or more networks 206.

The network(s) 206 can include, but are not limited to, any one or a combination of different types of suitable communications networks such as, for example, cable networks, public networks (e.g., the Internet), private networks, wireless networks, cellular networks, or any other suitable private and/or public networks. Further, the network(s) 206 can have any suitable communication range associated therewith and can include, for example, global networks (e.g., the Internet), metropolitan area networks (MANs), wide area networks (WANs), local area networks (LANs), or personal area networks (PANs). In addition, the network(s) 206 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

In some embodiments, the application server 208 can be any type of computing device with network access, such as a computer, laptop, server, tablet, smartphone, wearable computing devices, or the like. The application server 208 can be part of a cloud computing environment that provides a specific functionality to the user device 204, such as a shopping functionality or a software-as-a-service functionality. The user action engine 210 may include computer-readable instructions that in response to execution by the processor(s) 101, cause operations to be performed including obtaining user action data from a user device 204. In some embodiments, the user action engine 210 can receive a stream of data, which can include user action data. The user action engine 210 can transmit the user action data received from the user device 204 to a contextual help server 212.

In some embodiments, the contextual help server 212 can be any type of computing device with network access, such as a computer, laptop, server, tablet, smartphone, wearable computing devices, or the like. The contextual help server 212 can be part of a cloud computing environment that provides contextual help for a system, such as the service provided by the application server 208. The user action engine 214 can include computer-readable instructions that in response to execution by the processor(s) 101, cause operations to be performed including obtaining user action data from the user action engine 210 of the application server 208. In some embodiments, the user action engine 214 can receive the stream of data, which can include user action data, from the user action engine 210 of the application server 208. The user action engine 214 can process the user action data and transmit the processed user action data to a trace engine 216.

The trace engine 216 can include computer-readable instructions that in response to execution by the processor(s) 101, cause operations to be performed including receiving the processed user action data and capturing a concrete user action trace. In some embodiments, the trace engine 216 can identify a help trigger event (e.g., long pause, identified series of user actions), and can capture a predetermined number of actions that occurred prior to the identified help trigger event. In some embodiments, a help trigger event can be designated by an administrator of the system 200. In some embodiments, help trigger events can be identified by analyzing user actions from multiple users and identifying when users are encountering issues or problems.

In some embodiments, the concrete user action trace can be a subset of the user action data. A concrete user action trace can include user action data that reflects the specific actions taken by a user. For example, if a user is interacting with a shopping website, the concrete user action trace can include the following user actions: click on "Kids", Select "Girls", Select "T-shirts", Select Item, Click "add to card", click "view cart", and "click browser back button."

In some embodiments, the trace engine 216 can perform abstraction on the concrete user action trace to pre-process the user action data for subsequent analysis. In some embodiments, the trace engine 216 can generate an abstract user action trace using the data from the concrete user action trace. The user actions in the concrete user action trace can be abstracted to high-level user action types. Additional data in the concrete user action trace, such as timing information or device information, can be kept in the abstract user trace as metadata. To further the example above, the abstract user action trace generated from the concrete user action trace above can include the following high-level user action types: "item selection", "item selection", "item selection", "item selection", "add-to-cart click", "cart view", and "browser back".

The trace engine 216 can then build trace expressions using the generated abstract user action trace. In some embodiments, trace expressions built from the abstract action trace can be regular expressions that represent a set of traces. A trace expression can represent a subset of actions of the abstract user action trace. For example, the trace expression for the above example can be represented as "item selection+", "add-to-cart click", "cart view", and "browser back+". The trace expression can then represent all traces where any (non-zero) number of item selections is followed by an "add-to-cart" click and "cart view" action, which can then be followed by one or more instances of a user hitting the back button of a browser.

Trace expressions can provide a compact way to represent a group of traces. Trace expressions can provide a format that can be processed (including processing by an existing regular expression utilities. The trace engine 216 can transmit the built trace expressions to a contextual help engine 218.

The contextual help engine 218 can include computer-readable instructions that in response to execution by the processor(s) 101, cause operations to be performed including receiving trace expressions from the trace engine 216 and comparing the trace expressions to trace expressions that can be found in a help system data structure. In some embodiment, the help system data structure, such as a help system table, can be accessed or obtained from a data store, such as a contextual help datastore 220. The contextual help engine 218 can compare the trace expressions built from the abstract user action trace to trace expressions obtained from the help system data structure. If there is a match, the contextual help engine 218 can identify a help action corresponding to the trace expression in the help system data structure. The contextual help engine 218 can then facilitate presentation of the help action to the user device 204. In some embodiments, the contextual help engine 218 can transmit a message or notification to the user device 204. The message can indicate the help action and instructions associated with how to display the help action on the user device 204. The user device 204 can receive and process the message and/or notification. The user device 204 can then present the help action to the user of the user device 204 in accordance with the instructions.

The system 200 can include a contextual help datastore 220. In some embodiments, the contextual help datastore 220 can store a help system data structure, such as a help system table, which can store trace expressions and corresponding help actions. In some embodiments, the help system data structure can be developed by an administrator or help system developer. In some embodiments, the help system data structure can be developed and dynamically updated by analyzing user actions from many different users.

For example, the user actions of many different users can be classified as successful and not successful. The system can identify user actions that indicate the user may have encountered a problem or issue. The system can then analyze the user action data to identify actions taken after the identified problem or issue and identify user actions that may have resolved the problem or issue. The system 200 can generate trace expressions for user actions that occurred before the problem or issue was identified. The system 200 can then identify a help action based on the user actions that occurred after the problem or issue was identified and the system determined the user actions successfully resolved the identified problem or issue. In some embodiments, the trace expression generated by the system 200 can be associated with the help action identified by the system 200. The trace expression and corresponding help action can be added to the help system data structure. In some embodiments, the trace expression and corresponding help action can be added to the help system data structure upon satisfying a predetermined threshold. For example, the system can require that the trace expression and help action combination be identified from at least three different users over a predetermined period of time (e.g., one-month) to warrant inclusion in the help system data structure.

Figure 3:
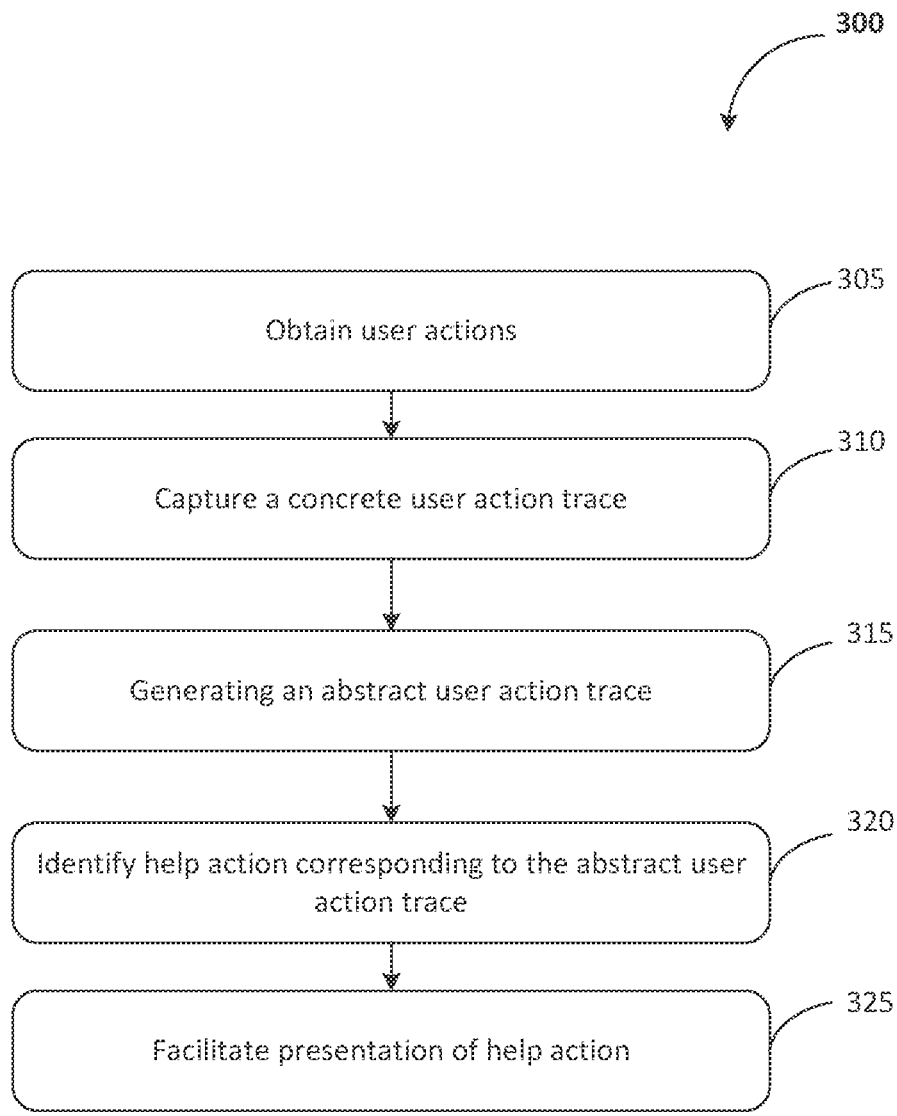
FIG. 3 is a flow diagram of a method for a path-sensitive contextual help system in accordance with an exemplary embodiment.

Now referring to FIG. 3, a flow diagram of a method 300 for a path-sensitive contextual help system in accordance with an exemplary and non-limiting embodiment is depicted. At block 305, user actions are obtained. In some embodiments, user actions can be captured by the user device 204 from the beginning of a user session. For example, if a user is browsing a shopping website, as a user session is initiated, the actions of the user can be captured and transmitted over a network to an application server 208. In some embodiments, the user action engine 210 can receive the user actions from the user device 204 and can transmit the user actions to the user action engine 214 of the contextual help server 212. In some embodiments, user actions can be represented by symbols. User interaction traces, such as a concrete user action trace or an abstract user action trace can be represented as strings of symbols. The user interaction traces can be represented as regular expressions.

At block 310, a concrete user action trace is captured. In some embodiments, a concrete user action trace can be captured in response to identifying a help trigger event. Examples of help trigger events include long pauses or a sequence of user actions executed by the user, such as hitting the help button one or more times. In some embodiments, the user action engine 214 can transmit the user action data to a trace engine 216. The trace engine 216 can capture a subset of user actions from the user action data received from the user device 204 (e.g., via the user action engine 210) as a concrete user action trace. In some embodiments, the concrete user action trace can include a predetermined number of actions from an identified help trigger event. A concrete user action trace can include symbols that represent the specific actions taken by the user on the user device 204.

In some embodiments, a help trigger event can be part of a help trigger events list. The help trigger events list can be a dynamically generated and maintained list. In some embodiments, a help trigger event can be identified when a user explicitly requests help (e.g., clicks a help button). The trace engine 216 can identify the preceding user actions and generate trace expressions as candidates for a new help trigger. If the same post-fix (e.g., ending fragment) of trace expressions are identified (e.g., across multiple times or across multiple users), leading up to the explicit request for help, then the help trigger event and corresponding trace expression can be added to the help trigger events list.

At block 315, an abstract user action trace is generated. In some embodiments, the trace engine 216 can process the concrete user action trace and abstract the specific actions of the user into a high-level type of action. For example, "Click on "Kids" category" in the concrete user action trace can be abstracted to "item selection" in the abstract user action trace. In some embodiments, the trace engine 216 can build a trace expression using the abstract user action trace. The trace expression can provide user history context to enable the contextual help engine 218 identify a help action to help the user based on an identified help trigger event and trace expression.

At block 320, a help action corresponding to the abstract user action trace is identified. The contextual help engine 218 can compare the trace expression generated from the user data to trace expressions that are obtained from a help system data structure. In some embodiments, the help system data structure can be obtained from a help system data store 220. The contextual help engine 218 can compare the trace expression generated from the user data with trace expressions from the help system data structure. In some embodiments, the contextual help engine 218 can detect whether the user interactions represented in the trace expressions correspond to trace expressions from a help system data structure by utilizing string matching techniques. In some embodiments, the contextual help engine 218 can compute the similarity of the generated trace expressions with the retrieved trace expressions by computing a statistical distance or a maximum overlap (e.g., largest common substring) between the two sets of trace expressions.

In some embodiments, the contextual help engine 218 can determine that the generated trace expression has a unique match with a help system data structure trace expression. The help action corresponding to the help system data structure trace expression can be identified. In some embodiments, the contextual help engine 218 can determine that the generated trace expression has multiple matches from the help system data structure. The contextual help engine 218 can apply one or more heuristics (e.g., such as selecting the first match or the closest match) to select a trace expression from the matching trace expressions and obtain the corresponding help action. In some embodiments, the contextual help engine 218 can determine that the generated trace expression does not have a match in the help system data structure and can provide a generic or default help action.

At block 325, presentation of the help action is facilitated. In some embodiments, the contextual help engine 218 can transmit a message or notification that contains the help action or a link to the help action. The message or notification can also include instructions regarding how to present the help action on the user device 204. In some embodiments, the message or notification can be transmitted to the application server 208, which can then transmit the message or notification to the user device 204. In some embodiments, the contextual help engine 218 can transmit the message or notification to the user device 204. In some embodiments, the user device 204 can receive the message or notification. If the message or notification contains instructions, the user device 204 can facilitate presentation of the help action on the user device 204 using the instructions. In some embodiments, the user device 204 can determine the type of help action in the message or notification and can present the user action on the user device 204 based at least in part on the type of user action, in accordance with one or more rules on the user device 204. For example, a help action can be in the form of a video, a pop-up window, a chat window, a link to a specific portion of a help system, or the like.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
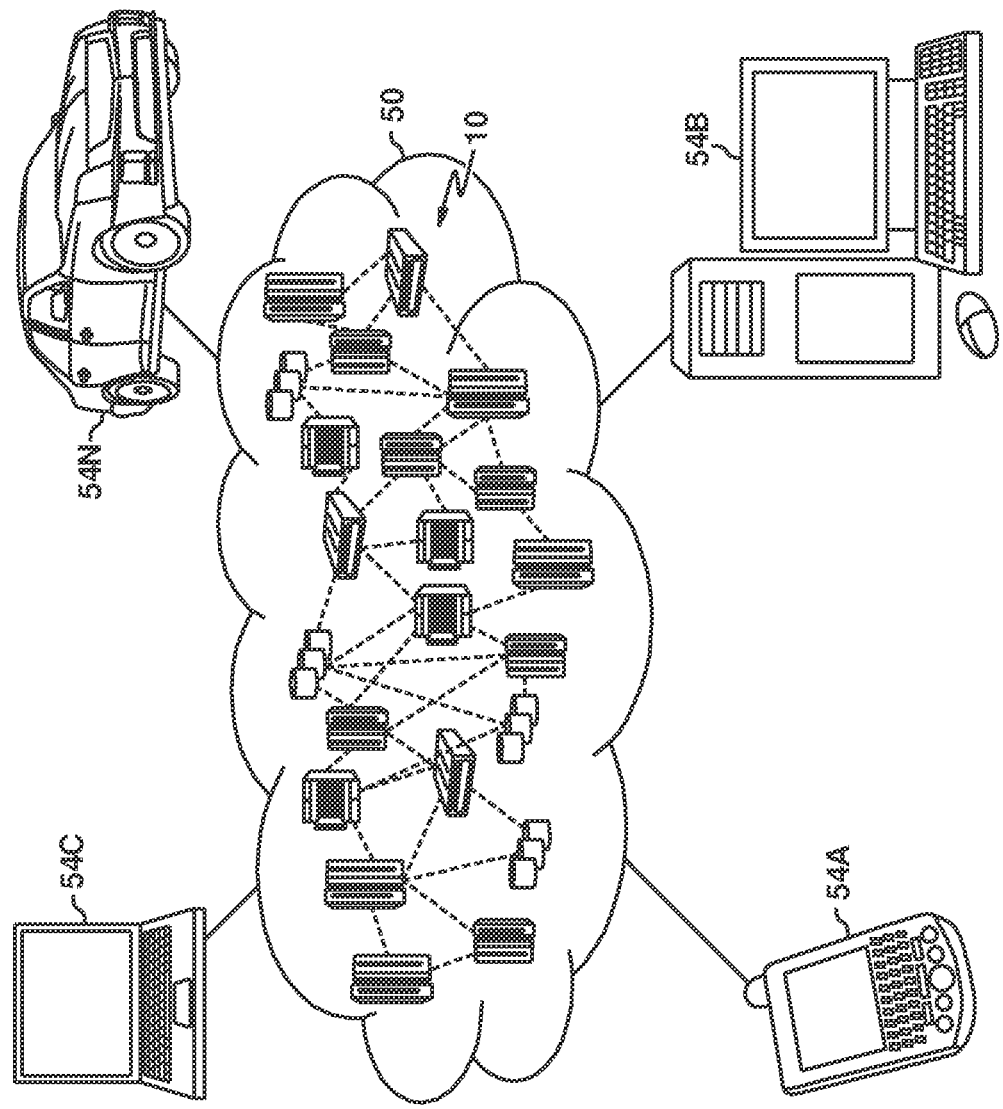
FIG. 4 depicts a cloud computing environment in accordance with an exemplary embodiment.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
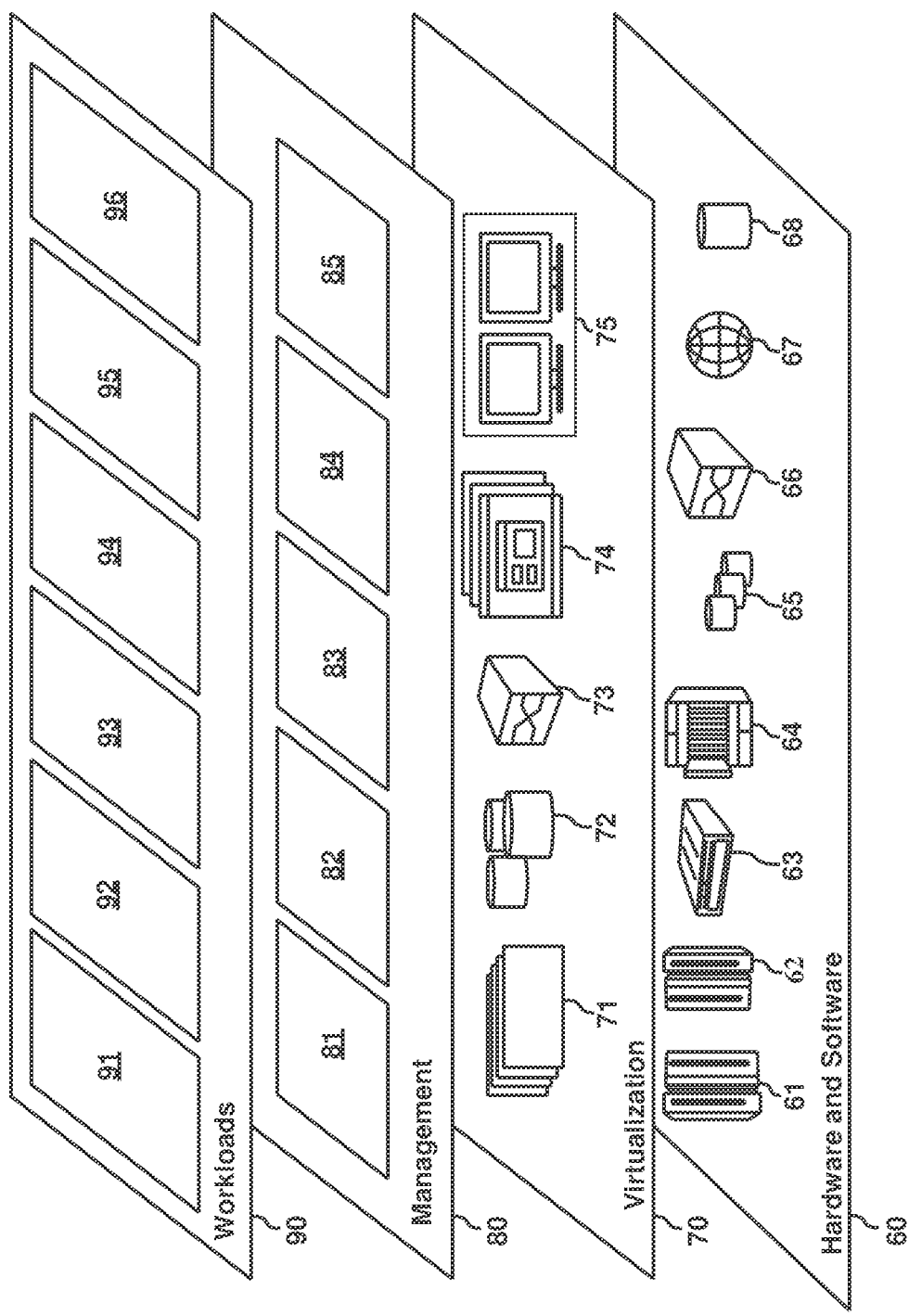
FIG. 5 depicts abstraction model layers in accordance with an exemplary embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and path-sensitive contextual help 96.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing path-sensitive contextual help, the method comprising:
   obtaining user actions from a user session of a user;
   capturing a concrete user action trace using the obtained user actions, wherein the concrete user action trace is a subset of user actions from the user session;
   generating an abstract user action trace using the concrete user action trace, wherein generating the abstract user action trace comprises abstracting the user actions in the concrete user action trace to high-level action types, the high-level action types including "item selection", "add-to-cart click", "cart view", and "browser back, and generating the abstract user action trace using the high-level action types corresponding to each of the user actions of the concrete user action trace; and
   identifying a help action corresponding to the abstract user action trace; and
   detecting a trigger event during the user session, the trigger event corresponding to a problem encounter by the user during the user session,
   wherein identifying the help action corresponding to the abstract user action trace further comprises comparing the abstract user action trace proceeding the trigger event with a plurality of trace expressions in a help data structure, and the help data structure comprises a help system table that stores the trace expressions along with stored help actions corresponding to the stored trace expressions, wherein the help data structure is dynamically updated by analyzing the user actions from several different users and wherein a particular help action is determined in response to a match between a high-level action corresponding to the abstract user trace and a stored trace expression, wherein a particular help action is determined in response to a match between a high-level action corresponding to the abstract user trace and a stored trace expression; and wherein the help action includes directing the user to a specific portion of the help system that resolves the problem encountered by the user, the specific portion of the help system including the particular help action such that context that matches context of a most recent high-level action type corresponding to a respective obtained user action.

2. The computer-implemented method of claim 1, wherein generating the abstract user trace comprises:
   identifying types of actions corresponding to each of the user actions of the concrete user action trace; and
   generating the abstract user action trace using the identified types of action corresponding to each of the user actions of the concrete user action trace.

3. The computer-implemented method of claim 1, wherein the specific portion of the help system including the particular help action such that context that matches context of a most recent high-level action type corresponds to a respective obtained user action.

4. The computer-implemented method of claim 3 further comprising:
   determining that the abstract user action trace matches a single trace expression from the plurality of trace expressions; and
   obtaining the help action corresponding to the single trace expression.

5. The computer-implemented method of claim 3 further comprising:
   determining the abstract user trace action matches two trace expressions from the plurality of trace expressions;
   using a heuristic to select one of the two trace expressions from the plurality of trace expressions; and
   obtaining the help action corresponding to the selected one of the two trace expressions.

6. The computer-implemented method of claim 3 further comprising:
   determining the abstract user trace action does not match any of the plurality of the trace expressions; and
   obtaining a generic help view to present to the user.

7. The computer-implemented method of claim 1 further comprising:
   obtaining user action data from a plurality of users;
   analyzing the user action data;
   identifying a new trace expression and a new corresponding help action based on the analyzed user action data; and
   adding a new entry in a help data structure comprising the new trace expression and the new corresponding help action.

8. A computer program product for providing path sensitive contextual help, the computer program product comprising a computer readable storage medium having program instructions embodied therewith, the program instructions readable by a processing circuit to cause the processing circuit to perform a method comprising:
   obtaining user actions from a user session of a user;
   capturing a concrete user action trace using the obtained user actions, wherein the concrete user action trace is a subset of user actions from the user session;
   generating an abstract user action trace using the concrete user action trace, wherein generating the abstract user action trace comprises abstracting the user actions in the concrete user action trace to high-level action types, the high-level action types including "item selection", "add-to-cart click", "cart view", and "browser back, and generating the abstract user action trace using the high-level action types corresponding to each of the user actions of the concrete user action trace; and
   identifying a help action corresponding to the abstract user action trace, wherein identifying the help action corresponding to the abstract user action trace further comprises comparing the abstract user action trace proceeding the trigger event with a plurality of trace expressions in a help data structure the help data structure comprising a help system table that stores the trace expressions along with stored help actions corresponding to the stored trace expressions, wherein the help data structure is dynamically updated by analyzing the user actions from several different users and wherein a particular help action is determined in response to a match between a high-level action corresponding to the abstract user trace and a stored trace expression; and
   detecting a trigger event during the user session, the trigger event corresponding to a problem encounter by the user during the user session,
   wherein a particular help action is determined in response to a match between a high-level action corresponding to the abstract user trace and a stored trace expression; and
   wherein the help action includes directing the user to a specific portion of the help system that resolves the problem encountered by the user, the specific portion of the help system including the particular help action such that context that matches context of a most recent high-level action type corresponding to a respective obtained user action.

9. The computer program product of claim 8, wherein generating the abstract user trace comprises:
   identifying types of action corresponding to each of the user actions of the concrete user action trace; and
   generating the abstract user action trace using the identified types of action corresponding to each of the user actions of the concrete user action trace.

10. The computer program product of claim 8, wherein the specific portion of the help system including the particular help action such that context that matches context of a most recent high-level action type corresponds to a respective obtained user action.

11. The computer program product of claim 10, wherein the method further comprises:
   determining the abstract user action trace matches a single trace expression from the plurality of trace expressions; and
   obtaining the help action corresponding to the single trace expression.

12. The computer program product of claim 10, wherein the method further comprises:
   determining the abstract user trace action matches two trace expressions from the plurality of trace expressions;
   using a heuristic to select one of the two trace expressions from the plurality of trace expressions; and
   obtaining the help action corresponding to the selected one of the two trace expressions.

13. The computer program product of claim 10, wherein the method further comprises:
   determining the abstract user trace action does not match any of the plurality of the trace expressions; and
   obtaining a generic help view to present to the user.

14. The computer program product of claim 8, wherein the method further comprises:
   obtaining user action data from a plurality of users;
   analyzing the user action data;
   identifying a new trace expression and a new corresponding help action based on the analyzed user action data; and
   adding a new entry in a help data structure comprising the new trace expression and the new corresponding help action.

15. A computer system, comprising:
   a processor in communication with one or more types of memory, the processor configured to:
      obtain user actions from a user session of a user;
      capture a concrete user action trace using the obtained user actions, wherein the concrete user action trace is a subset of user actions from the user session;
      generate an abstract user action trace using the concrete user action trace, wherein generating the abstract user action trace comprises abstracting the user actions in the concrete user action trace to high-level action types, the high-level action types including "item selection", "add-to-cart click", "cart view", and "browser back, and generating the abstract user action trace using the high-level action types corresponding to each of the user actions of the concrete user action trace; and
   identify a help action corresponding to the abstract user action trace, wherein identifying the help action corresponding to the abstract user action trace further comprises comparing the abstract user action trace proceeding the trigger event with a plurality of trace expressions in a help data structure, the help data structure comprising a help system table that stores the trace expressions along with stored help actions corresponding to the stored trace expressions, wherein the help data structure is dynamically updated by analyzing the user actions from several different users and wherein a particular help action is determined in response to a match between a high-level action corresponding to the abstract user trace and a stored trace expression; and
   detect a trigger event during the user session, the trigger event corresponding to a problem encounter by the user during the user session,
   wherein a particular help action is determined in response to a match between a high-level action corresponding to the abstract user trace and a stored trace expression; and
   wherein the help action includes directing the user to a specific portion of the help system that resolves the problem encountered by the user, the specific portion of the help system including the particular help action such that context that matches context of a most recent high-level action type corresponding to a respective obtained user action.

16. The computer system of claim 15, wherein the processor is further configured to generate the abstract user trace by:
   identifying types of action corresponding to each of the user actions of the concrete user action trace; and
   generating the abstract user action trace using the identified types of action corresponding to each of the user actions of the concrete user action trace.

17. The computer system of claim 15, wherein the specific portion of the help system including the particular help action such that context that matches context of a most recent high-level action type corresponds to a respective obtained user action.

18. The computer system of claim 17, wherein the processor is further configured to:
   determine the abstract user action trace matches a single trace expression from the plurality of trace expressions; and
   obtain the help action corresponding to the single trace expression.

19. The computer system of claim 17, wherein the processor is further configured to:
   determine the abstract user trace action matches two trace expressions from the plurality of trace expressions;
   use a heuristic to select one of the two trace expressions from the plurality of trace expressions; and
   obtain the help action corresponding to the selected one of the two trace expressions.

20. The computer system of claim 15, wherein the processor is further configured to:
   obtain user action data from a plurality of users;
   analyze the user action data;
   identify a new trace expression and a new corresponding help action based on the analyzed user action data; and
   add a new entry in a help data structure comprising the new trace expression and the new corresponding help action.

* * * * *